UNITED STATES PATENT OFFICE.

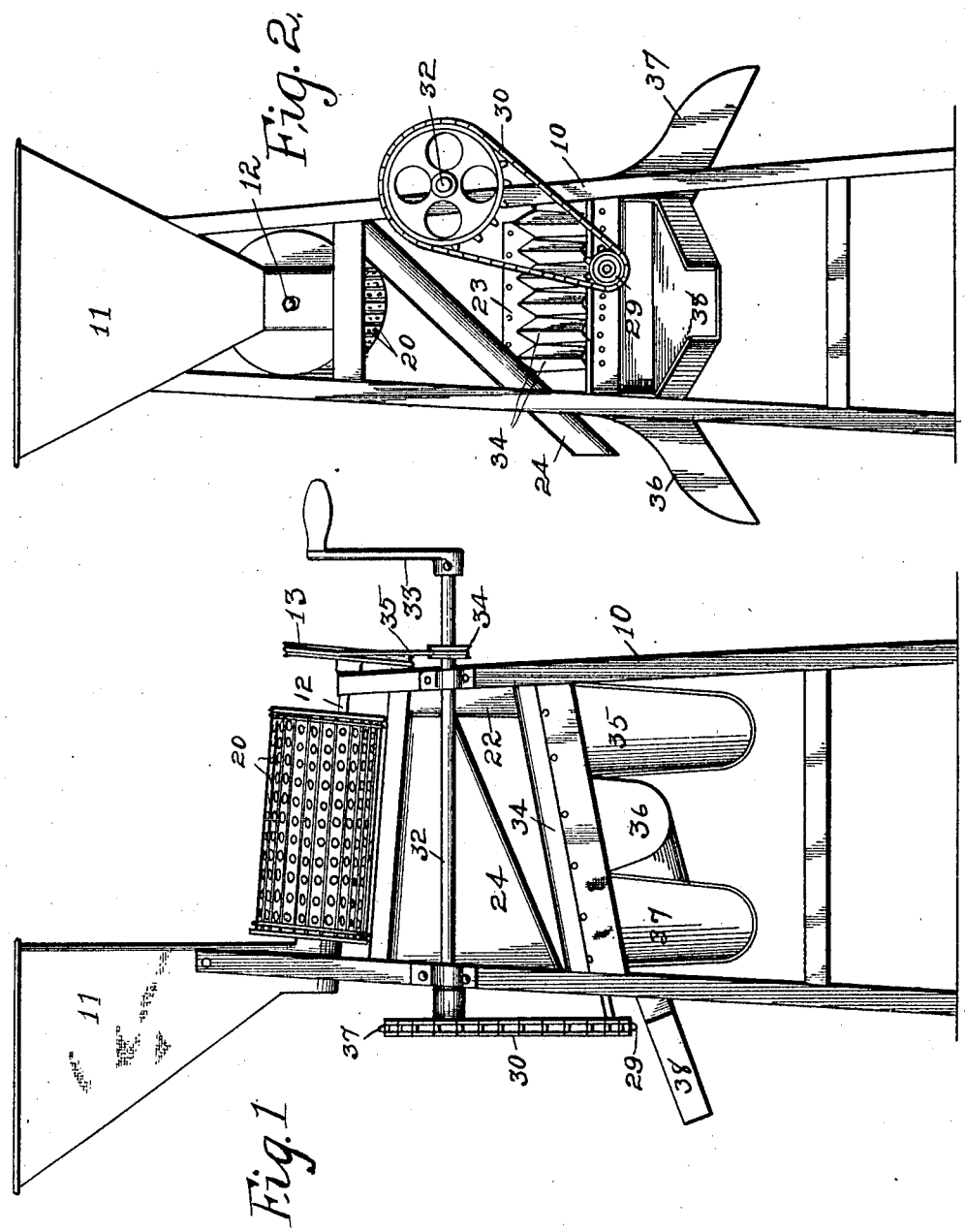

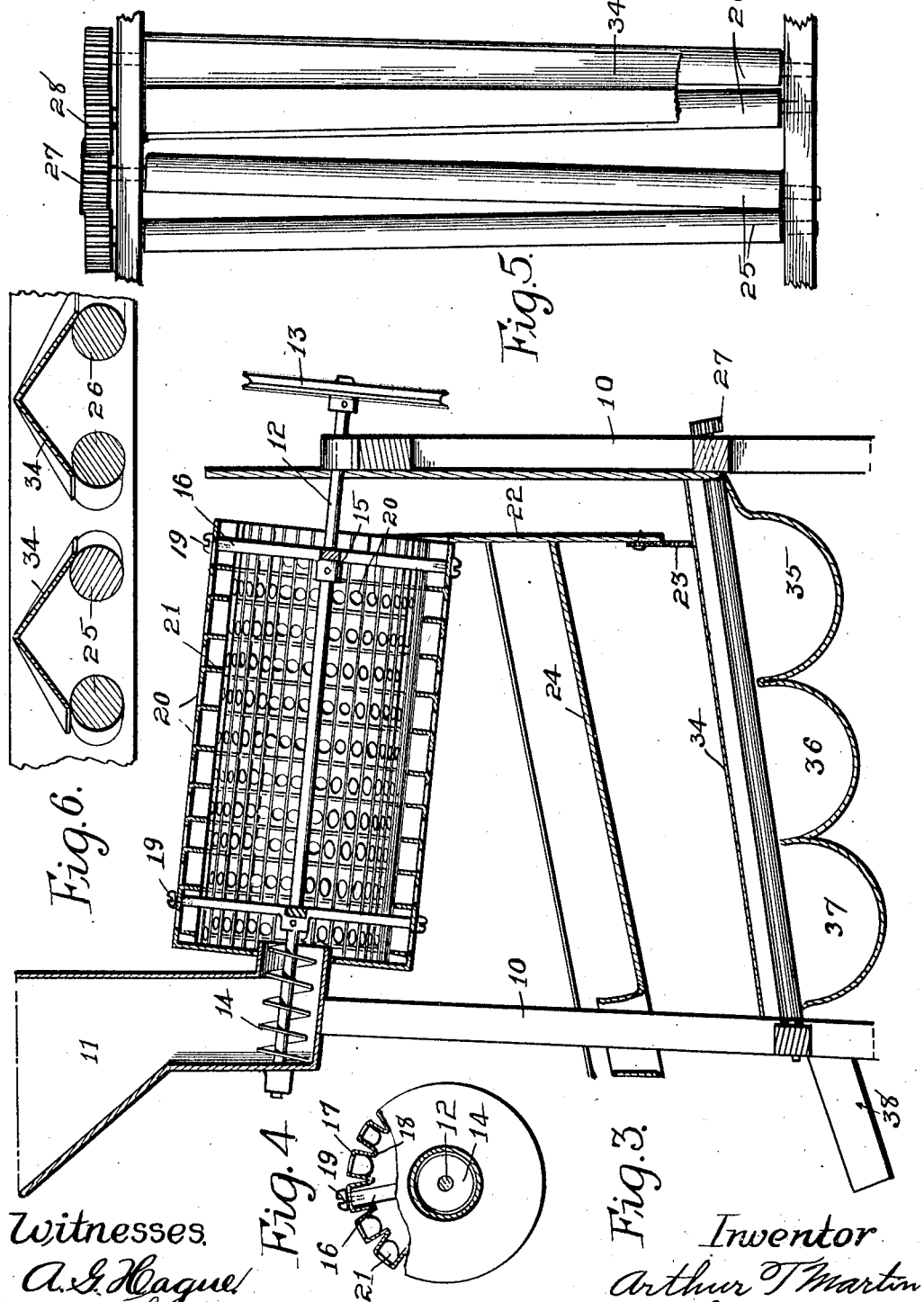

ARTHUR T. MARTIN, OF SAC CITY, IOWA.

SEED-GRADER.

1,026,327.  Specification of Letters Patent.  Patented May 14, 1912.

Application filed January 27, 1911. Serial No. 604,987.

*To all whom it may concern:*

Be it known that I, ARTHUR T. MARTIN, a citizen of the United States, residing at Sac City, in the county of Sac and State of Iowa, have invented a certain new and useful Seed-Grader, of which the following is a specification.

The object of my invention is to provide a machine of simple, durable and inexpensive construction designed to be operated by applying power for the purpose of first grading seeds in such a manner as to discharge all seeds having less than a certain predetermined width from one side edge to the other and to retain all those that have a certain predetermined width or greater regardless of the thickness of said seeds; and further it is my object to provide means whereby the seeds retained in the machine will be graded according to their thickness only so that seeds of a certain predetermined thickness or less will pass into one compartment, those of a slightly greater predetermined thickness into another compartment, and those of still larger thickness into a third compartment so that said seeds may be successfully used in connection with seed planters of the class in which the edge-drop-corn planters are found.

More specifically it is my object to provide an improved screen of simple, durable and inexpensive construction for first grading seeds as to their width regardless of their thickness; and further in this connection it is my object to provide a screen device so arranged that the seeds will be placed in upright positions in independent compartments, each compartment being provided with a round opening at its lower end so that seeds will all be stood on end within separate compartments so that they may pass through the round openings if their greatest width from edge to edge is less than that of the openings and so that seeds will be prevented from passing over said openings when lying in flat positions thereon.

A further object is to provide improved means for grading seeds as to their thickness only regardless of their width; and further in this connection to provide means whereby the seeds will be prevented from sticking or lodging in the slots through which they are passed.

My invention consists in certain details, in the construction, arrangement and combination of the various parts of the device whereby the objects contemplated are attained, as hereinafter more fully set forth, pointed out in my claims and illustrated in the accompanying drawings, in which:

Figure 1 shows a side elevation of a seed grader embodying my invention. Fig. 2 shows a front elevation of same. Fig. 3 shows a vertical, longitudinal, central, sectional view of same. Fig. 4 shows a detail, end view of the rotary sieve device with parts broken away to show details of construction. Fig. 5 shows a top or plan view of a portion of the device for grading the seeds according to thickness, and Fig. 6 shows an enlarged, detail, sectional view through the rollers of the grader device for separating seeds according to their thickness to illustrate the arrangement of the shields relative to the rollers.

Referring to the accompanying drawings, I have used the reference numeral 10 to indicate the machine frame. At the upper portion of the machine frame is a hopper 11 into which seeds to be graded are placed. Rotatably mounted near the upper portion of the machine frame is a power shaft 12 having a pulley 13 thereon by which it may be driven. One end of this shaft extends into the hopper 11 and is provided with a screw conveyer 14 within the hopper for the purpose of removing seeds from the hopper. Fixed in position on the power shaft are two hubs 15, each being provided with a number of radial arms 16 for the purpose of supporting a cylindrical seed grading device for grading seeds according to their width. This grading device is preferably formed of a single piece of sheet metal formed into a cylinder and being provided with a series of flat outer faces 17 and substantially V-shaped folds 18 between said flat faces, said folds being extended inwardly toward the center of the cylinder. The cylinder is supported upon the arms 16 by screws 19 and each of the flat faces 17 of the cylinder is provided with a series of round openings 20, each opening being formed by cutting out the material to an extent slightly less than a complete circle. Then the material thus cut out which is substantially disk-shaped is bent inwardly to position substantially at right angles to the cylinder. These disks are indicated by the numeral 21 and in the completed device they stand spaced apart from each other about the same distance as the width of the flat surfaces 17 so that the entire interior of the cylinder is formed into substantially rectangular pockets open at their inner ends and provided at their outer ends with round openings. The cylindrical grading device is slightly tilted downwardly from its end adjacent to the hopper 11. In use and assuming that seeds such as grains of corn are placed in the cylinder, the said pockets that are at or near the bottom of the cylinder will all be open to admit grains of corn when presented vertically and in each of the pockets there will be a grain of corn inserted in an upright position as the size of the pockets is such as to prevent a grain of corn from entering a pocket when the grain of corn is lying flat. In each of the pockets thus formed if the grain of corn is smaller in width than the diameter of the round opening it will pass through regardless of the length or the thickness of said grain of corn, or if the grain of corn is of a width greater than the size of the opening it will remain in the pocket until the upper pocket containing said grain has turned partly around so that it stands near the top of the cylinder, whereupon it will drop by gravity and enter one of the other pockets of the cylinder. By this means it is obvious that seeds such, for instance, as corn that have a length greater than their width, and a width greater than their thickness, will be acted on by the sieve in such a manner as to remove the seeds that are of less than a certain predetermined width regardless of their length or thickness.

Adjacent to the outer end of the cylinder is a partition 22 preferably having at its lower end a flexible strip 23 for purposes hereinafter made clear. Below the cylinder is a laterally inclined chute 24 having its discharge end arranged at the side of the machine frame as shown in Fig. 2.

Arranged in the frame below the cylindrical grading device is a device for grading seeds as to their thickness regardless of their width or length. This device comprises a series of pairs of rollers, the rollers of one pair being indicated by the numerals 25 and 26 as shown in Fig. 5. These rollers are mounted in suitable bearings in the frame and are provided on one end with pinions 27 and 28 in mesh with each other. The said rollers are of uniform diameter throughout their length but they are arranged in the frame slightly out of parallelism and so arranged as to provide a slot between them tapered from a minimum size at one end to a maximum size at the other. On one of said rollers is a sprocket wheel 29 connected by a sprocket chain 30 with a sprocket wheel 31 on a driving shaft 32, which driving shaft is provided with a crank 33 by which it may be operated, and with a pulley 34 connected by a belt 35 with the pulley 13 on the cylinder shaft. The power thus transmitted to one of the rollers is transmitted to all of them by means of the pinions 27 and 28 and said pinions on each pair of said rollers are arranged in mesh with the adjacent pinions of adjacent pairs of rollers, as illustrated in Fig. 5, so that all of the pinions and all of the rollers are operated simultaneously when the shaft 32 is rotated. I also arrange these rollers so that they will incline downwardly toward the discharge end thereof so that seeds placed on the rollers will gradually slide by gravity toward the discharge end. In order to direct all of the seeds that are deposited upon the rollers to points between the pairs of rollers and to prevent said seeds from entering between adjacent rollers of different pairs, I have provided a series of sheet metal shields 34 fixed to the frame above the adjacent rollers to two side by side pair of rollers, as clearly illustrated in Fig. 6. Said shields are so arranged as to prevent seeds from entering between the rollers of two different pairs and to require the seeds to enter between the rollers of the pairs. The sprocket wheel 29 is rotated in such a direction that the rollers of each pair will have their adjacent faces both moved upwardly at the same time and this motion will be transmitted by the pinions 27 and 28 to all of the rollers in the device so that the rollers of each pair will have their adjacent faces both moving upwardly when being rotated. The said flexible strip 23 rests on top of the shields 34, as clearly shown in Fig. 2, so that the seeds will be permitted to feed gradually under the said flexible strip. On account of the manner in which the rollers of each pair are moved, it is obvious that flat seeds cannot become wedged or caught between the rollers but that they will always lie loosely in the slots between the rollers of the pairs and they will gradually move by gravity from the receiving to the delivery end of the rollers unless the seeds are of such thickness that they can freely and readily pass between the rollers.

Beneath the grading rollers, I have provided three transverse chutes 35, 36 and 37 so arranged that the seeds that drop into one chute may be discharged into a separate receptacle at the side of the frame. Obviously all of the seeds of relatively small thickness will drop through into the chute 35, those of a medium thickness into the chute 36, and those of a maximum thickness into the chute 37. The remainder will be discharged over the end of the rollers through the chute 38.

In practical use, it is obvious that the seeds to be graded may be placed in the hopper 11 and the crank 33 may then be manipulated. This will cause the screw conveyer 14 to gradually deliver the seeds into the rotary cylinder. The seeds in the rotary cylinder will be graded according to their width and all small seeds and also the round seeds that do not have a grade width will be eliminated. The seeds that are of greater width than the size of the round openings will be passed through to the grading rollers and there they will be fed gradually to the rollers and separated according to their thickness as before described, and all danger of having the rollers clogged up by seeds sticking between them is avoided by the turning of the rollers with their adjacent surfaces moving upwardly in the same direction.

In order to successfully and economically grade flat seeds such as corn in regard to their thickness so that they will be suitable for use in an edge-drop-corn planter or the like, it is necessary that there first be provided some means for removing all of the small round seeds such, for instance, as grow at the ends of ears of corn, and then the remaining seeds must be graded by means of a grading device having slots so that the seeds may pass through edgewise and be graded according to thickness. Therefore in a machine of this kind it is necessary to provide both a grading device to accomplish the purposes for which my improved cylinder is provided and a second grading device to accomplish the purpose for which my improved rollers are provided.

I claim as my invention:

1. In a device of the class described, the combination of a cylinder, a series of longitudinally arranged ribs on the interior of the cylinder and transversely extended partitions between the ribs to form pockets open at both ends, the openings at the outer ends of the pockets being of substantially the same size both transversely and longitudinally of the cylinder.

2. In a device of the class described, the combination of a sheet metal cylinder, formed with a series of longitudinally arranged ribs extending inwardly, the material between each pair of ribs being provided with a series of round openings, the material cut from the cylinder to form said round openings being inclined inwardly to thereby form with each other and with the said ribs substantially rectangular pockets open to the interior of the cylinder and provided each with a round opening through the cylinder.

3. In a device of the class described, the combination of a cylinder provided with a series of pockets open on the interior of the cylinder, said pockets being of substantially the same size both longitudinally and transversely of the cylinder and each pocket being provided with an opening at its outer end, said opening being of substantially the same size both transversely and longitudinally of the cylinder, an inclined shaft, means for operating said shaft, means for supporting said cylinder on the inclined shaft, and means for delivering seeds to the upper end of the cylinder, the lower end thereof being open to permit seeds to discharge.

4. In a device of the class described, the combination of a cylinder, provided with a series of pockets open on the interior of the cylinder, said pockets being of substantially the same size both longitudinally and transversely of the cylinder and each pocket being provided with an opening at its outer end, said opening being of substantially the same size both transversely and longitudinally of the cylinder, a frame, an inclined shaft mounted in the frame, means for fixing the cylinder to the shaft, a screw conveyer fixed to the shaft, and a hopper having said screw conveyer mounted therein, said hopper being extended into the interior of the cylinder, for the purposes stated.

Des Moines, Iowa, January 16, 1911.

ARTHUR T. MARTIN.

Witnesses:
R. D. LYON,
GEO. F. MARTIN.

---

Copies of this patent may be obtained for five cents each, by addressing the "Commissioner of Patents, Washington, D. C."